United States Patent
Hosogoe

(10) Patent No.: US 6,955,295 B2
(45) Date of Patent: Oct. 18, 2005

(54) CARD ISSUING SYSTEM

(75) Inventor: Takashi Hosogoe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 51 days.

(21) Appl. No.: 10/912,042

(22) Filed: Aug. 6, 2004

(65) Prior Publication Data

US 2005/0045716 A1 Mar. 3, 2005

Related U.S. Application Data

(63) Continuation of application No. PCT/JP02/02534, filed on Mar. 18, 2002.

(51) Int. Cl.$^7$ ................................................ G06F 7/08
(52) U.S. Cl. ..................... 235/382; 235/380; 235/382; 705/1; 705/38; 705/39
(58) Field of Search ............................... 235/381, 382, 235/380; 705/1, 38, 39

(56) References Cited

U.S. PATENT DOCUMENTS 5,648,647 A * 7/1997 Seiler .......................... 235/380
5,883,452 A * 3/1999 Masuda ........................ 235/380
5,887,271 A * 3/1999 Powell ......................... 705/14
2002/0138422 A1 * 9/2002 Natsuno ....................... 705/39

FOREIGN PATENT DOCUMENTS

| JP | 2-56692 | 2/1990 |
|---|---|---|
| JP | 8-106499 | 4/1996 |
| JP | 9-297867 | 11/1997 |
| JP | 10-11496 | 1/1998 |
| JP | 11-110491 | 4/1999 |
| JP | 2001-283122 | 10/2001 |

* cited by examiner

Primary Examiner—Jared J. Fureman
Assistant Examiner—Allyson N Trail
(74) Attorney, Agent, or Firm—Armstrong, Kratz, Quintos, Hanson & Brooks, LLP

(57) ABSTRACT

When a plurality of cards are produced successively, a risk value is calculated in regard to either data deletion or change on the card issue data of each card caused by cancellation of issue or a change of address. The cards are produced in ascending order of the risk value, so that the production of a card having higher occurrence probability of data deletion or change is postponed to the maximum extent. With this, it becomes possible to reduce such work as discarding the card due to the issue cancellation or replacing a pasteboard due to the address change required after the card is produced. Thus, efficient card issue processing can be obtained.

9 Claims, 10 Drawing Sheets

FIG. 4

| ITEM | RISK FACTOR | STATES | RISK PARAMETER |
|---|---|---|---|
| States of payment | 1 0 0 | Payment delay not less than 3 times in there 2 years | 100 |
| | | Payment delay once in these 2 years | 50 |
| | | No payment delay for these 2 years | 10 |
| | | No payment delay since becoming a menber | 0 |
| States of borrowing | 6 0 | No less than 80% of the limit amount in any cases | 100 |
| | | No less than 30% of the limit amount | 30 |
| | | Less than 30% of the limit amount | 10 |

FIG. 5

| ITEM | RISK FACTOR | STATES | RISK PARAMETER |
|---|---|---|---|
| Name of employer (School) | 70 | A company (Frequent transfer of workplace) | 100 |
| | | B company (Workplace transfer not so often) | 50 |
| | | C company (Workplace transfer quite rare) | 50 |
| | | University student (In case of less than 2 months left before graduation) | 100 |
| | | University student (Except for the above case) | 10 |
| | | Self-employed | 10 |
| Residence type | 30 | Rented | 100 |
| | | Self-owned | 20 |
| Residence transfer history | 100 | More than twice in these 3 years | 100 |
| | | Once in these 3 years | 30 |
| | | No transfer for these 10 years | 10 |

FIG. 6A

| CARD NUMBER | VALIDITY PERIOD | NAME | ADDRESS | ... | RISK VALUE |
|---|---|---|---|---|---|
| xxxx-xxxx-xxxx-xxx1 | 2007/03 | ○×○× | △□△□ | | 30 |
| xxxx-xxxx-xxxx-xxx2 | 2007/03 | ○×○× | △□△□ | | 100 |
| xxxx-xxxx-xxxx-xxx3 | 2007/03 | ○×○× | △□△□ | | 50 |
| xxxx-xxxx-xxxx-xxx4 | 2007/03 | ○×○× | △□△□ | | 30 |
| xxxx-xxxx-xxxx-xxx5 | 2007/03 | ○×○× | △□△□ | | 50 |
| ... | | | | | |

FIG. 6B

| CARD NUMBER | VALIDITY PERIOD | NAME | ADDRESS | ... |
|---|---|---|---|---|
| xxxx-xxxx-xxxx-xxx1 | 2007/03 | ○×○× | △□△□ | |
| xxxx-xxxx-xxxx-xxx4 | 2007/03 | ○×○× | △□△□ | |
| xxxx-xxxx-xxxx-xxx3 | 2007/03 | ○×○× | △□△□ | |
| xxxx-xxxx-xxxx-xxx5 | 2007/03 | ○×○× | △□△□ | |
| xxxx-xxxx-xxxx-xxx2 | 2007/03 | ○×○× | △□△□ | |
| ... | | | | |

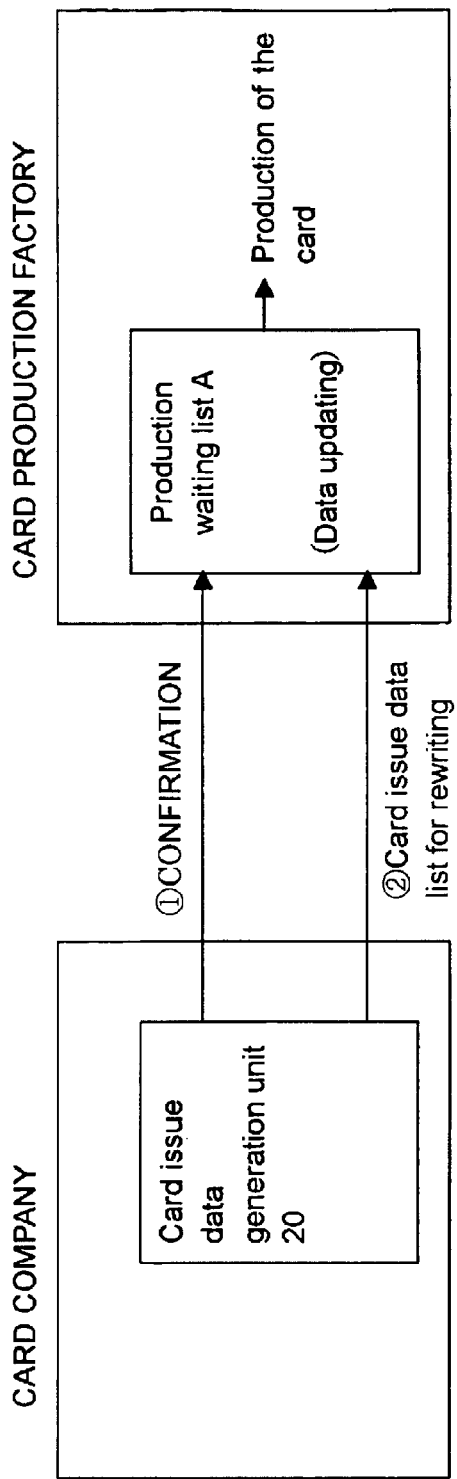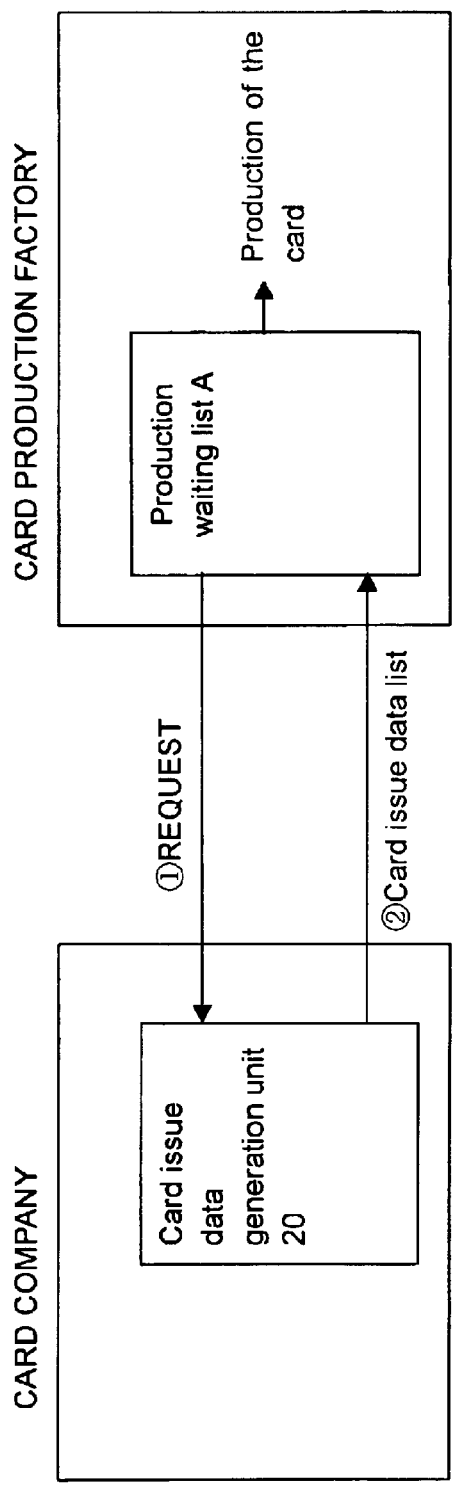

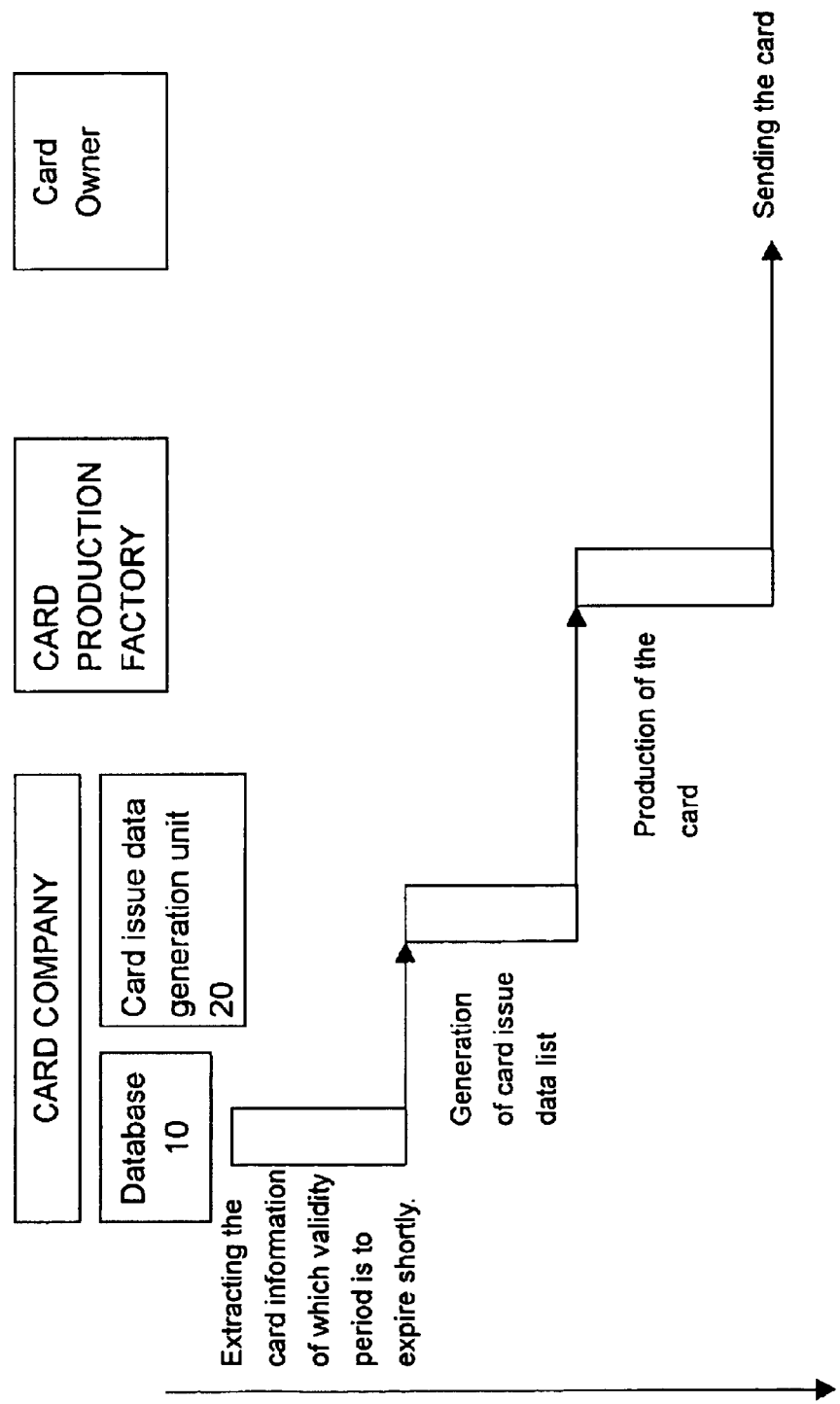

CARD ISSUING SYSTEM

This application is a continuation of international application PCT/JP02/02534 filed Mar. 18, 2002.

BACKGROUND OF THE INVENTION

1. Field of the Invention

The present invention relates to a card issuing system for issuing an updated card such as a credit card having a validity period, and more particularly a card issuing system capable of restraining occurrence of a loss of discarding a card once produced due to issue cancellation, etc.

2. Description of the Related Art

FIG. 12 shows a diagram illustrating a flow of issuing a credit card (which may simply be referred to as card in the following description). As shown in FIG. 12, conventionally, when reissuing the card of which validity period is to expire shortly, a card company prepares card issue data several months before the expiration date, using a card issuing system based on the list of the cards to expire. Each card issue data includes print information to be printed on the card face (with embossed finish), such as name, card number and validity period, mailing address information such as an address of the card owner, and the like. The prepared card issue data is forwarded to a card production factory. Based on the card issue data, the card production factory produces a card, which is then attached to a pasteboard having printed name and address to be mailed to, enclosed into an envelope for mailing, and mailed to the card owner immediately before the expiration date of the original card. Generally, a few months are required from the start of the procedure for issuing a new card until the card owner receives the issued card.

FIG. 13 shows a diagram illustrating card production processing in the card production factory. On receiving the card issue data from the card company for the number of cards to be issued, for example, on a monthly basis, the card production factory produces a predetermined number of cards every day. Thus, the card production factory spends a predetermined number of days (for example a few weeks or the like) on producing the entire cards for the month. Thereafter, the entire cards having been produced are stocked and managed in the card production factory for a certain period of time (from a few days to a week or the like), and then the cards are mailed to the residences of the card owners.

However, there often arise cases that issue of a card has to be canceled during a period from the time the card company started the card issue procedure to the time the card is actually produced (this period of time is hereafter referred to as 'card production process period'), as described above. Such cancellation of card issue is caused by a request from the card owner, a credit problem of the card owner, or the like. In such cases, when the issue of the card once produced is canceled, the card is to be discarded. This produces wasted card issue costs, as well as card discarding costs.

Furthermore, there may be cases that transfer of the card owner or address change is carried out during the card production process period. In such cases, for example when address change occurs in regard to a card already produced, an additional work in the card production factory is necessary, which includes searching the envelope for enclosing the produced card, opening the envelope, inserting a new pasteboard having a new printed address into the envelope again, etc.

SUMMARY OF THE INVENTION

It is an object of the present invention to provide a card issuing system enabling reduction of wasted work caused by occurrence of a cause of deletion or change on a card issue data, such as work for discarding the card already produced due to issue cancellation, and work for changing a mailing address due to address change.

In order to attain the above-mentioned object, according to the present invention, a card issuing system is provided for issuing updates of a plurality of cards, of which validity period is to expire in a predetermined time, by spending a predetermined period of time. A configuration of the card issuing system includes: a generation means for generating a card issue data list including each card issue data of a plurality of cards scheduled for issue; a calculation means for calculating a risk value in regard to possible occurrence of data deletion or change on each card issue data; and a decision means for deciding the sequence of issuing the plurality of cards based on each risk value.

More specifically, the card issuing sequence is in ascending order of the risk value. By way of example, the risk value is an issue cancellation risk value representing a risk value of canceling the issue of each card corresponding to each card issue data, or the risk value is an address change risk value representing a risk value of changing the address for sending each card corresponding to each card issue data.

As such, the cards are produced in order starting with the lowest occurrence probability in regard to data deletion or change of the card issue data, and production of a card having a higher value of the above-mentioned occurrence probability is postponed to the maximum extent. With this, it becomes possible to reduce work such as for discarding the card due to issue cancellation and for replacing the pasteboard due to address change, respectively required after the card is produced. Thus, efficient card issue processing can be obtained.

Further, the aforementioned decision means notifies a predetermined card production factory of both the card issue data list and the issuing sequence, and the card production factory produces the plurality of cards according to the issuing sequence.

Further scopes and features of the present invention will become more apparent by the following description of the embodiments with the accompanied drawings.

BRIEF DESCRIPTION OF THE DRAWINGS

FIG. 4 shows an example of a parameter table for evaluating issue cancellation risk by calculation.

FIG. 5 shows an example of a parameter table for evaluating address change risk by calculation.

FIGS. 6A, 6B show examples of a card issue data list.

FIG. 10 shows a diagram illustrating a third example of issue cancellation processing or address change processing performed in a card production factory.

FIG. 11 shows a diagram illustrating a fourth example of issue cancellation processing or address change processing performed in a card production factory.

FIG. 12 shows a diagram illustrating a flow of credit card issuing.

DETAILED DESCRIPTION OF THE PREFERRED EMBODIMENTS

The preferred embodiment of the present invention is described hereinafter referring to the charts and drawings. However, it is noted that the scope of the present invention is not limited to the embodiments described below.

Figure 1:
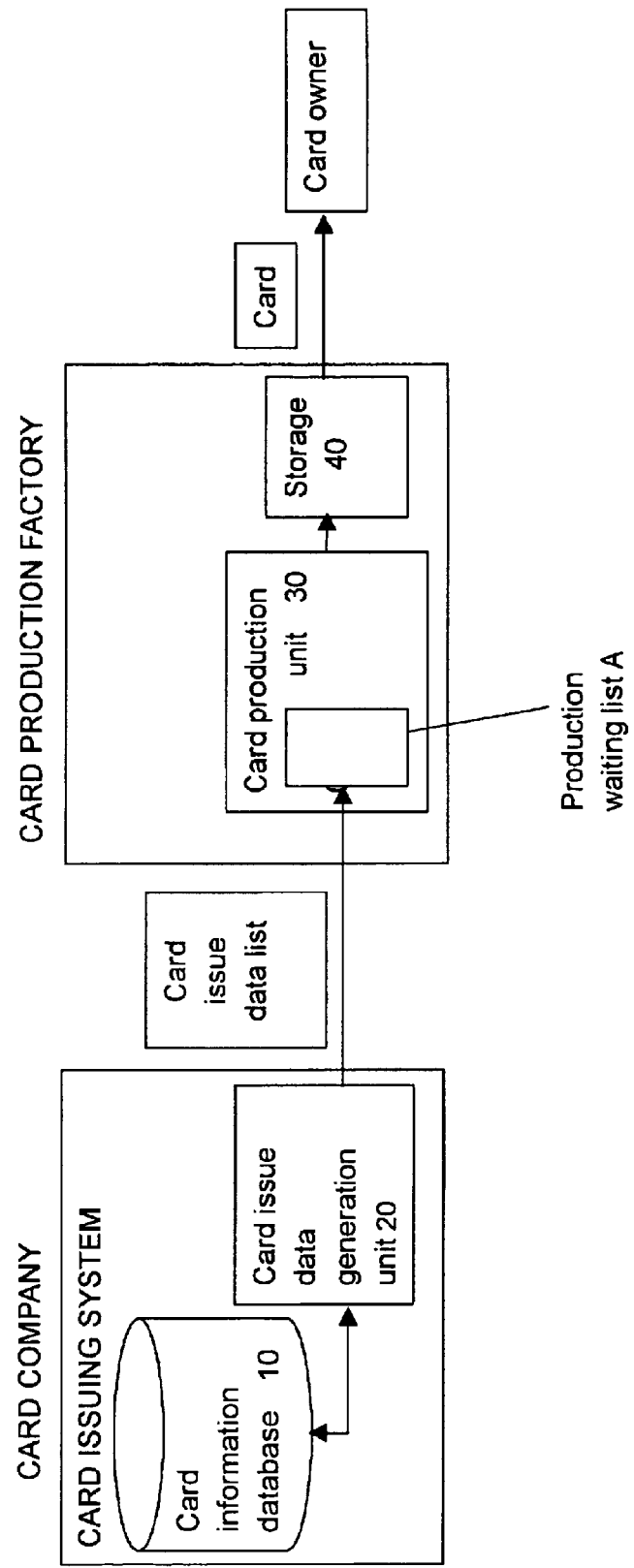
FIG. 1 shows a configuration example of a card issuing system according to an embodiment of the present invention.

FIG. 1 shows a configuration example of a card issuing system according to an embodiment of the present invention. In this FIG. 1, the card issuing system of the card company is provided with a card information database 10 for managing card information of the credit cards having been issued, and a card issue data generation unit 20 for generating card issue data. By way of example, database 10 and card issue data generation unit 20 are constituted of a server. A card issue data generated by card issue data generation unit 20 is sent to a card production factory. A card production unit 30 in the card production factory produces a card in accordance with the card issue data. The produced card is stocked for a certain period, and thereafter is sent to the residence of a card owner.

Figure 2:
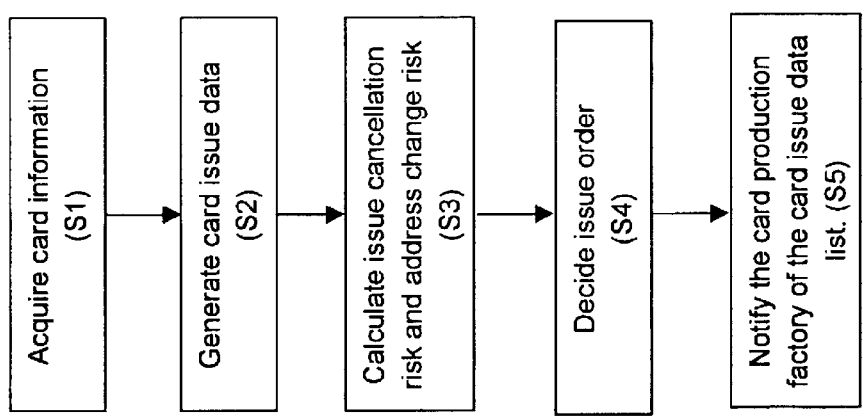
FIG. 2 shows a processing flowchart of a card issuing system according to an embodiment of the present invention.

FIG. 2 shows a processing flowchart of a card issuing system according to an embodiment of the present invention. Card issue data generation unit 20 refers to database 10, and extracts card information of which validity period is to expire soon. More specifically, for example on a predetermined day of a month, card issue data generation unit 20 acquires card information of the cards of which expiration month is two months later (S1).

Figure 3:
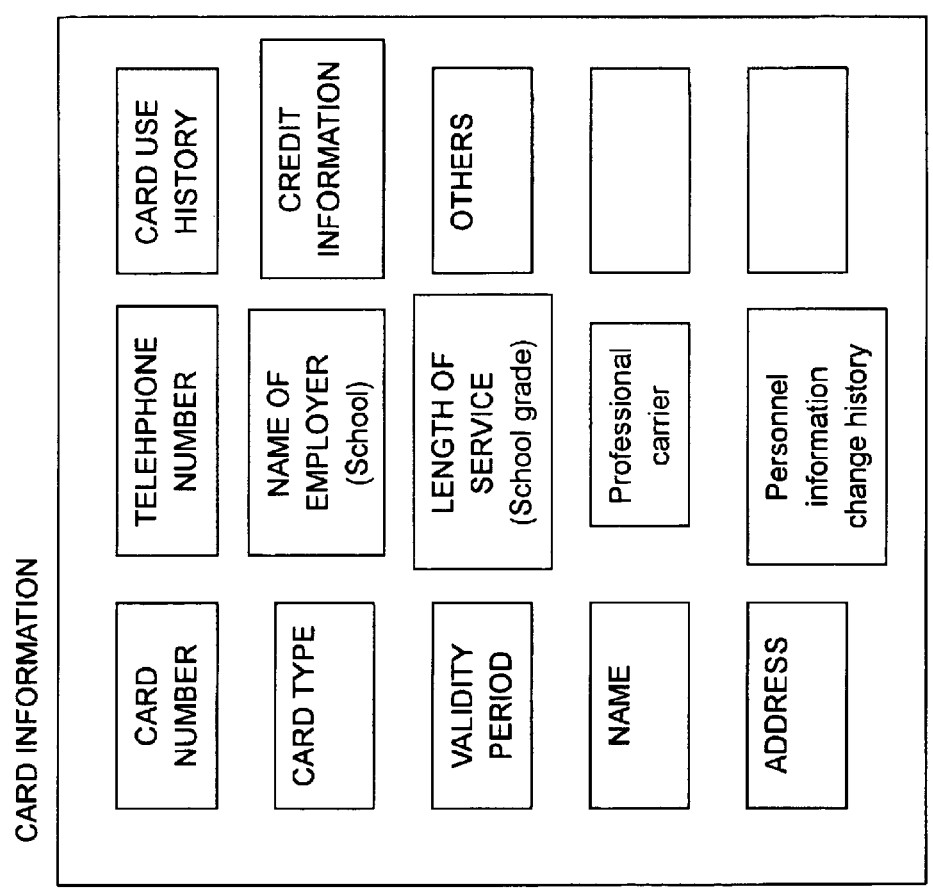
FIG. 3 shows a diagram illustrating an example of card information.

FIG. 3 shows a diagram illustrating an example of the card information. As shown in FIG. 3, the card information includes card number, card type, validity period, name of the card owner, address, telephone number, name of employer (school), length of service (school grade), professional carrier, change history of personal information (address, etc.), card use history, credit information, and other data.

Card issue data generation unit 20 extracts the data necessary for issuing the card from the card information, and generates the card issue data (S2). The card issue data includes at least card number, validity period of the next term, and name and address of the card owner.

As a feature of the embodiment according to the present invention, card issue data generation unit 20 evaluates issue cancellation risk and address change risk by calculation against each card of which card issue data has been generated (S3). In the following, the issue cancellation risk and the address change risk will be explained.

FIG. 4 shows an example of a parameter table for calculating the issue cancellation risk. The issue cancellation risk represents a degree of risk with which the card company cancels updating the card of a card owner, based on the card use conditions (including use of credit and/or cashing services) of the card owner. A risk factor with regard to each item shown in FIG. 4 (use conditions of credit and/or loan) is set according to the degree of importance of the item concerned. And, a risk parameter value corresponding to the condition of each item is set according to the magnitude of the risk concerned.

For example, as to the item of using the credit service, a risk parameter value is set depending on the frequency of delayed payment. Also, as to the item of using the loan service, a risk parameter value is set depending on the balance of the loan. Histories of the delayed payment and the loan balance can be obtained from the use history included in the card information.

FIG. 5 shows an example of a parameter table for calculating address change risk. The address change risk represents a degree of possibility that the card owner changes the address. Similar to the issue cancellation risk shown in FIG. 4, a risk factor of each item is set according to the degree of importance of the item concerned, and a risk parameter value corresponding to the condition of each item is set according to the magnitude of the risk concerned.

By way of example, as to the item of the company of employment, a risk parameter is set according to the frequency of transferring work places within the company concerned. Also, as to the item of the residence, a risk parameter value is set according to a residence type (privately owned house or rented house). Also, as to the address change history, a risk parameter values is set according to the frequency of the address change in the past. The frequency of the transfer of the work places in the company is set in advance as card information, under classification into three stages or the like as shown in the figure. For example, the stage is registered by the declaration from each card owner at the time of card subscription. The residence type of each card owner is included in the card information, which can also be registered by the declaration from the card owner at the time of card subscription. The item of address transfer history is available from the personnel information change history included in the card information.

Based on the above-mentioned risk parameter data, card issue data generation unit 20 calculates a total risk value with regard to each card issue data using the following formula.

$$\text{Total risk value} = \Sigma A_i X_i + \Sigma B_j Y_j$$

$A_i$: Risk factor of each item listed in the issue cancellation parameter table.

$X_i$: Each risk parameter value listed in the issue cancellation parameter table.

$B_j$: Risk factor of each item listed in the address change parameter table.

$Y_j$: Each risk parameter value listed in the address change parameter table.

The smaller the total risk value is, the lower the occurrence probability of issue cancellation and address change is. Namely, when the total risk value is relatively large, the occurrence possibility of issue cancellation and address change during the card production process period becomes high. When issue cancellation or address change occurs after the card is produced, wasteful work such as discarding the card and replacing the pasteboard for mailing attaching the card is unavoidable. By postponing to the maximum extent producing the card having a relatively larger total risk value, wasteful production of the card becomes avoidable even when issue cancellation occurs, as long as the card concerned has not been produced. Also, even when address change occurs, simply by producing the pasteboard with the newly changed address printed thereon, the above-mentioned wasteful work becomes avoidable also.

On the other hand, as to the card issue data having a relatively smaller total risk value, since the occurrence probability of issue cancellation and address change is low, the possibility of occurrence of the wasteful work is low even though the cards are produced earlier.

Accordingly, referring back to FIG. 2,.card issue data generation unit 20 decides the card issue sequence in ascending order of the total risk value after calculating the total risk value in regard to each card issue data (S4). Thereafter, card issue data generation unit 20 notifies card production factory of the card issue data list, so that the cards are produced in ascending order of the total risk value (S5).

The card issue data list includes a collective data of the card issue data generated above. Card issue data generation unit 20 notifies the card production factory of the card issue data list to which the total risk values obtained above are attached. Card issue data generation unit 20 requests the card production factory for producing the cards in order of the card issue data with the smallest total risk value at the top.

FIGS. 6A, 6B show examples of a card issue data list. In the card issue data list shown in FIG. 6A, card issue data each having a total risk value is arranged, for example, in order of card number.

Or, when the card production factory produces cards in order of the card issue data listed on the card issue data list, the card issue data list having been arranged in order of the total risk values is sent to the card production factory. Thus, the card production factory proceeds to produce cards in order of the card issue data recorded in the card issue data list, which results in producing the cards in ascending order of the total risk value, starting from the card issue data having the smallest total risk value. In FIG. 6B, an example of the card issue data list arranged in ascending order of the total risk values is shown.

As such, by producing the cards in order of the card issue data having been arranged in ascending order of the risk value, production of a card having a larger risk value is relatively delayed. For example, when cancellation of issuing a card is requested from the time of issuing the card issue data to the time the card is actually produced (i.e. during card production process period), production of the card concerned is avoidable. As such, by postponing the production (in other words, by elongating the card production process period) of the card having a larger issue cancellation risk, the occurrence probability of wasted card production can be reduced.

Similarly, by postponing producing the card (i.e. elongating the card production process period) as to the card issue data having a larger address change risk, the occurrence probability of replacement work of the card pasteboards caused by address change can be reduced.

Figure 7:
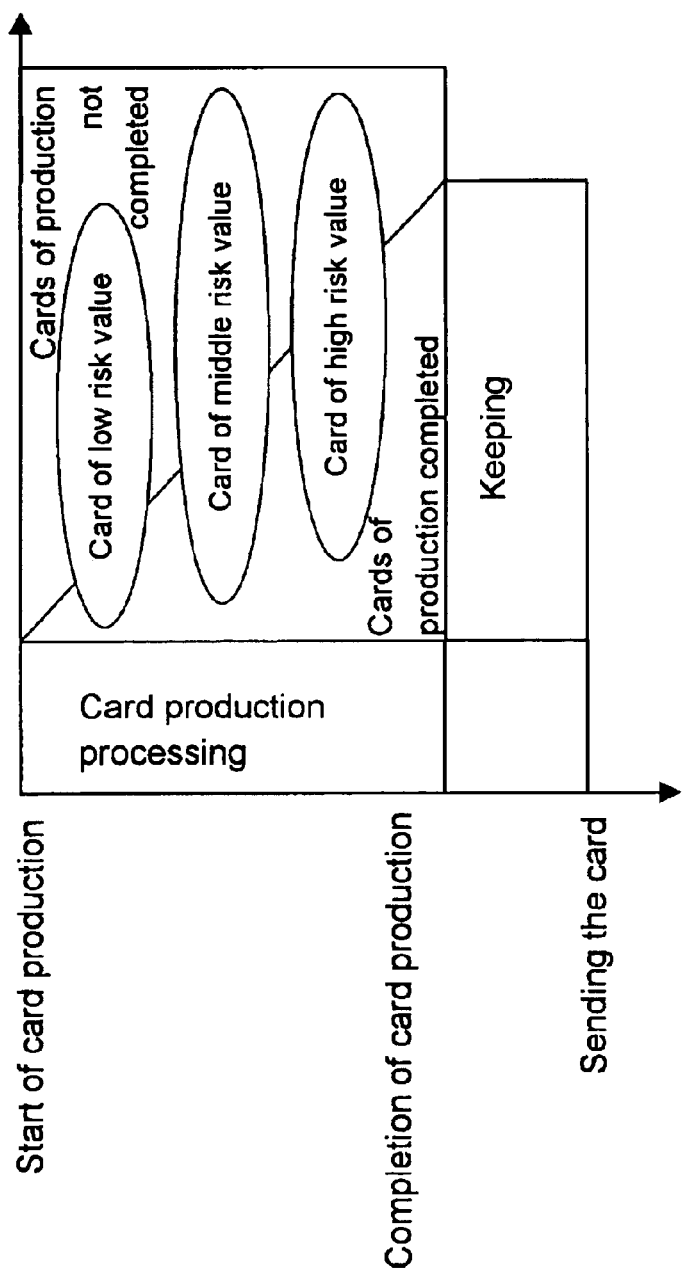
FIG. 7 shows a schematic diagram of card production processing according to an embodiment of the present invention.

FIG. 7 shows a schematic diagram of card production processing according to the embodiment of the present invention. As shown in this FIG. 7, the card production factory produces cards in ascending order of the risk value, and the time of production of the card having a larger risk value becomes later.

Here, card issue data generation unit 20 may feed the card issue data list to a predetermined unit in the card production factory by transmitting the data through a communication line, or by mailing to the card production factory a recording medium containing the card issue data list. Based on the card issue data list received through the arbitrary means, card production unit 30 in the card production factory successively produces the cards, starting with the card issue data having the smallest total risk value.

Now, hereafter processing performed in the event of issue cancellation or address change after the card issue data list is sent to the card production factory will be described.

Figure 8:
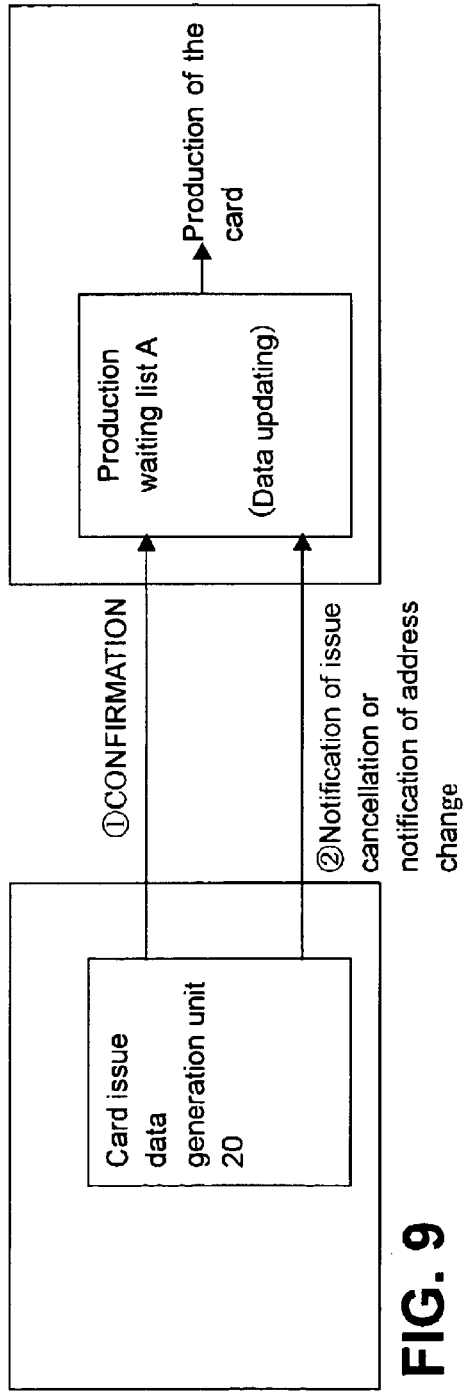
FIG. 8 shows a diagram illustrating a first example of issue cancellation processing or address change processing performed in a card production factory.

FIG. 8 shows diagram illustrating a first example of issue cancellation processing or address change processing performed in the card production factory. The card company inquires the card production factory whether the card related to the card issue data list sent before has not been produced yet. Here, the card issue data list by which the card has not been produced is registered in advance in a production waiting list A in the card production factory. Therefore, by searching through the production waiting list A, whether or not the relevant card has been produced can be confirmed. When confirming that the card issue data to which either issue cancellation or address change is required is still in the production waiting list A, the card company sends an issue cancellation notification or an address change notification to the card production factory.

When a management system (not shown) provided in the card production factory receives the issue cancellation notification from the card company, the management system deletes the card issue data concerned from the production waiting list A. Meanwhile, on receiving the address change notification, the management system changes the content of the relevant card issue data in the production waiting list A to the content of the address change notification.

On the other hand, when the object card issue data for issue cancellation is not registered in the production waiting list A, namely when the card concerned has already been produced though the produced card is not mailed yet (that is, the card concerned is kept in the storage), the card concerned is discarded. Also, when the object card issue data for address change has already been produced, while the produced card is kept in the storage, the pasteboard for attaching the card, having the former address printed thereon, is replaced to a pasteboard having the printed new address. Additionally, when the card has already been mailed, then proper measure is taken in the card company.

Figure 9:
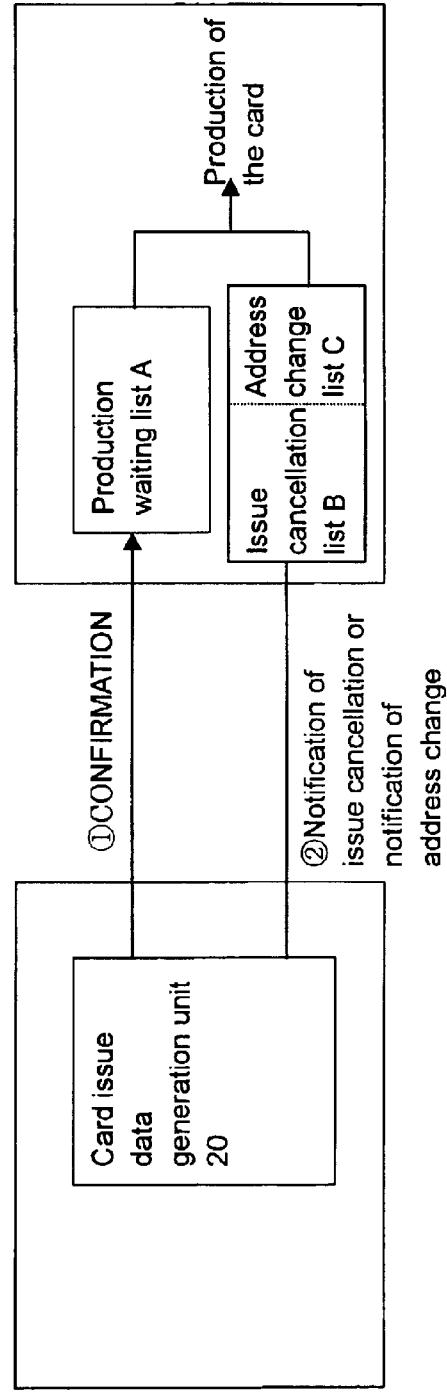
FIG. 9 shows a diagram illustrating a second example of issue cancellation processing or address change processing performed in a card production factory.
Figure 13:
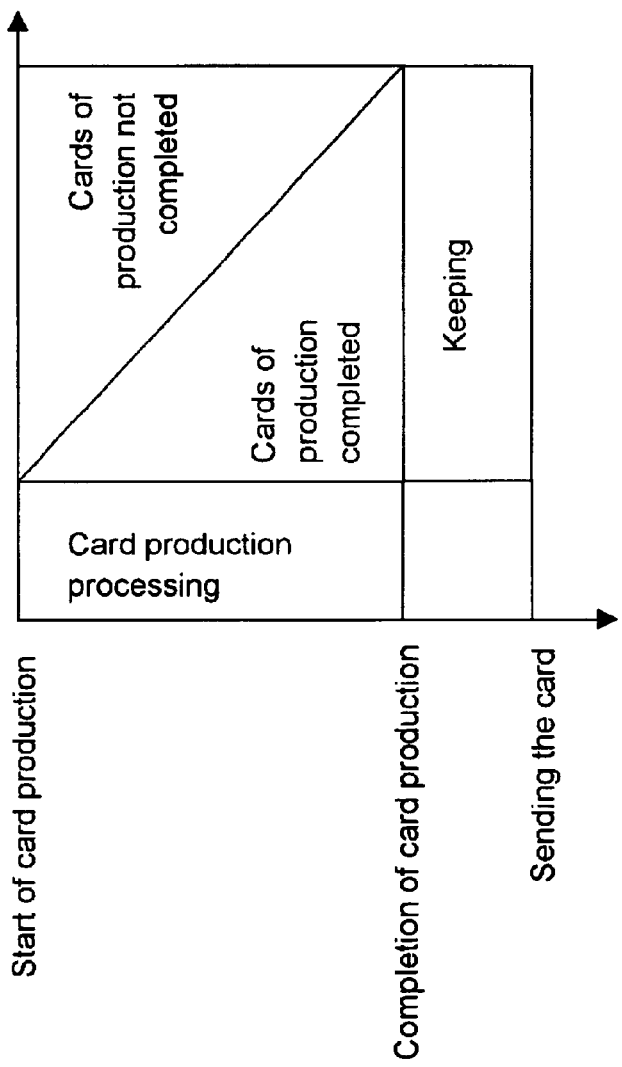
FIG. 13 shows a diagram illustrating card production processing in a card production factory.

FIG. 9 shows a diagram illustrating a second example of issue cancellation processing or address change processing performed in the card production factory. On confirming that the card related to the card issue data list sent before has not been produced yet, the card company sends an issue cancellation notification or an address change notification to the card production factory. When a management system (not shown) in the card production factory receives either the issue cancellation notification or the change notification from the card company, the management system registers the issue cancellation notification into an issue cancellation list B, or registers the address change notification into an address change list C. When producing the cards, card production unit 30 refers to the production waiting list, the issue cancellation list B and the change list C, and produces the cards based on the card issue data excluding the card issue data having been registered in the issue cancellation list B. Also, card production unit 30 produces a pasteboard with the printed new address, according to the address change list C.

Also, when the card has already been produced, the similar processing to that shown in FIG. 8 is performed, of which detailed description is omitted here.

FIG. 10 shows a diagram illustrating a third example of issue cancellation processing or address change processing performed in a card production factory. In this third example, when the card company confirms that the card related to the card issue data list sent before has not been produced yet, the card issue data of which issue is to be canceled is deleted, and/or, as to the object card issue data for address change, a new card issue data list (rewritten card issue data list) including the changed address is sent again to the card production factory. The card production factory updates the card issue data list that was received before and kept in the production waiting list A to the updated card issue data list newly received. Based on the updated card issue data list, the card production factory produces the cards.

As to the case when the card of interest has already been produced, the similar processing to that shown in FIG. 8 is performed, of which detailed description is omitted here.

FIG. 11 shows a diagram illustrating a fourth example of issue cancellation processing or address change processing performed in a card production factory. In the fourth example, the card production factory requests the card company to send the card issue data list immediately before producing the cards. In this case, since the card company keeps the card issue data list immediately before the cards are produced, the card company can send the card issue data list to the card production factory after completing update of the card issue data that include issue cancellation or address change having occurred. Also, in case the card issue data list is generated in response to the request from the card production factory, the card company generates the card issue data list based on the most up-to-date data, taking into account the occurrence of issue cancellation, address change, etc. and sends the data list to the card production factory.

In the above-mentioned embodiment of the present invention, the card issuing sequence is determined based on the risk values in combination of the issue cancellation risk with the address change risk. However, it may also be possible to determine based on either of the above. Namely, the card issue order may be determined in ascending order of the card cancellation risk, or in ascending order of the address change risk.

Also, in the above description, the issue cancellation risk or the address change risk is the risk that necessitates data deletion or data modification. However, the risk against data deletion or data modification is not limited to the issue cancellation risk or the address change risk. For example, it is also possible to take into consideration a risk of personal name change that may be caused by, for example, marriage of the card owner.

Application of the aforementioned embodiment of the present invention is not only limited to the credit cards, but to other card media having validity period.

APPLICATION FIELDS OF INDUSTRY

According to the present invention having been described above, the occurrence probability of issue cancellation and address change to the cards having been produced becomes low, which brings about reduced work of discarding the cards or replacing the pasteboards, and enables efficient issuing the cards.

It is noted that the scope of protection of the present invention is not limited to the particular details of the examples illustrated. The scope of protection extends to the inventions described in the appended claims and the equivalents thereof.

What is claimed is:

1. A card issuing system for issuing updates of a plurality of cards, of which a validity period of each card is to expire in a predetermined time, wherein the card issuing system spends a predetermined period of time, said card issuing system comprising:
   a generation means for generating a card issue data list including each card issue data of a plurality of cards scheduled for issue;
   a calculation means for calculating a risk value in regard to possible occurrence of data deletion or change on each card issue data; and
   a decision means for deciding an issuing sequence of the plurality of cards based on each said risk value.

2. The card issuing system according to claim 1, wherein the card issuing sequence is in an ascending order of the risk value.

3. The card issuing system according to claim 1, wherein the risk value includes an issue cancellation risk value representing a risk value of canceling the issue of each card corresponding to each card issue data.

4. The card issuing system according to claim 1, wherein the risk value includes an address change risk value representing a risk value of changing the address for sending each card corresponding to each card issue data.

5. The card issuing system according to claim 1, wherein the decision means notifies a predetermined card production factory of both the card issue data list and the issuing sequence, and
the card production factory produces the plurality of cards according to the issuing sequence.

6. The card issuing system according to claim 5, wherein when a cause of data deletion or data change occurs on at least one card issue data after the notification of the card issue data list to the card production factory, and yet before the card production in the card production factory, the decision means respectively notifies the card production factory of either a deletion data for deleting said card issue data or a change data for changing said card issue data.

7. The card issuing system according to claim 5, wherein when a cause of data deletion or data change occurs on at least one card issue data after the notification of the card issue data list to the card production factory, and yet before the card is produced in the card production factory, the decision means notifies the card production factory again of a new card issue data list having the card issue data of interest being either deleted due to said cause of deletion or changed due to said cause of change.

8. The card issuing system according to claim 5, wherein when a cause of data deletion or data change occurs on at least one card issue data before the notification of the card issue data list to the card production factory, the generation means again generates a new card issue data list having the card issue data of interest being either deleted due to said cause of deletion or changed due to said cause of change.

9. A method for issuing updates of a plurality of cards, of which a validity period of each card is to expire in a predetermined time, wherein the card issuing system spends a predetermined period of time, said method comprising:
   a generation step for generating a card issue data list including each card issue data of a plurality of cards scheduled for issue;
   a calculation step for calculating a risk value in regard to possible occurrence of data deletion or change on each card issue data; and
   a decision step for deciding an issuing sequence of the plurality of cards based on each said risk value.

* * * * *